Oct. 25, 1938.  I. ROĆIĆ  2,134,376

COMBINATION RANGE, BROILER, TOASTER, AND OVEN

Filed Aug. 20, 1935

INVENTOR.
IVAN ROĆIĆ

BY Warren E. Willis
ATTORNEY.

Patented Oct. 25, 1938

2,134,376

UNITED STATES PATENT OFFICE 2,134,376

COMBINATION RANGE, BROILER, TOASTER, AND OVEN

Ivan Ročić, New York, N. Y.

Application August 20, 1935, Serial No. 36,968

2 Claims. (Cl. 126—41)

This invention relates to combination cooking apparatus in which gas may be used as the fuel.

An object is to provide an apparatus on which several kinds of cooking, as baking, broiling, toasting, etc., can be done concurrently if desired, thus conserving the fuel used.

A further feature is in the provision of means whereby part or the whole of the apparatus may be used without interference with the others.

Another purpose is to produce a pivotally suspended plate adapted for broiling purposes and means to retain any drippings from the food cooked thereon, this plate being indirectly heated from the main burner.

These advantageous objects are accomplished by the novel construction and arrangement of parts hereinafter described and illustrated in the accompanying drawing, constituting an essential component of this disclosure, and in which:—

Figure 1:
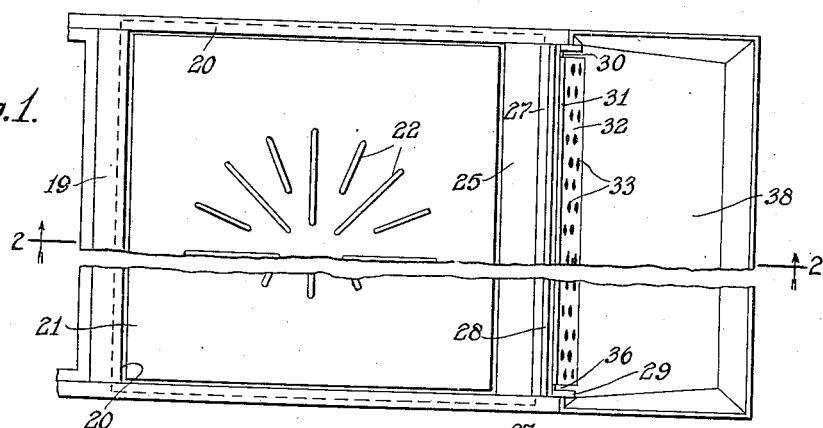
Figure 1 is a partial top plan view of an embodiment of the invention.
Figure 2:
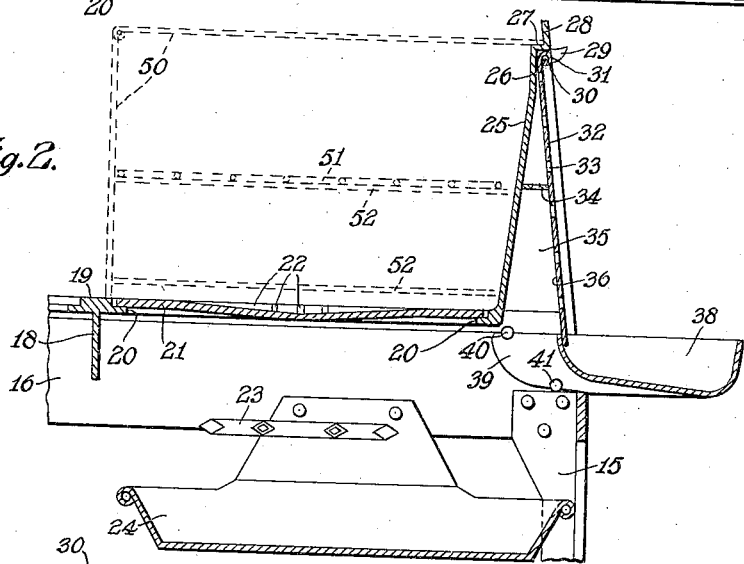
Figure 2 is a sectional view taken on line 2—2 of Figure 1.
Figure 3:
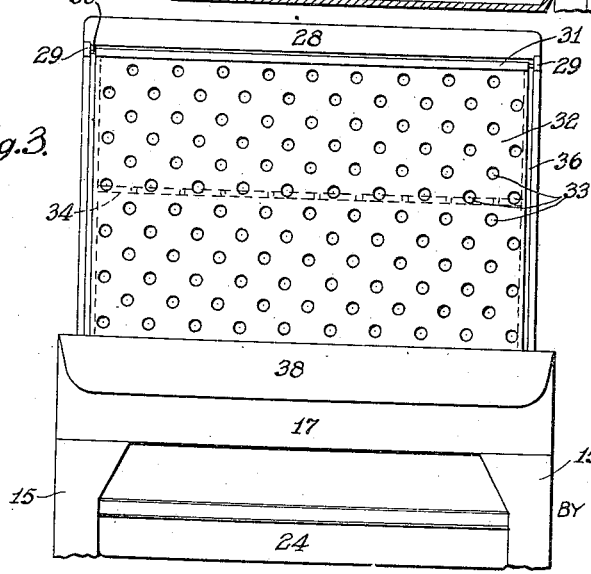
Figure 3 is an elevational view looking from the right hand end of Figure 1.

Referring in greater detail to the drawing, the numeral 15 designates the legs of the apparatus arranged at the corners and attached to the side plates 16 of a rectangular stand, these plates being upright on their edges and connected at their ends by similar plates 17.

Extending between the plates 16 are T-shaped bars 18 having stepped heads 19 forming part of the main frame 20, and having an inreaching flange on which rests an oven bottom plate 21, its center portion being slightly concave and provided with reenforcing ribs 22.

Under the oven plate is a burner 23 of any preferred type, and therebelow is a pan 24 suspended in a manner to admit of removal.

The main support frame 20 has at its outer end edge an outwardly inclined curtain plate 25, vertical at its upper portion 26 and offset outwardly to form a ledge 27, above which extends a stop rail 28.

Projecting outwardly from both side edges of the plate 25, level with the ledge 27 are hook-like catches 29 for supporting toasting appliances, as racks and the like.

Set in the catches are inreaching pivots 30 on which is suspended the curled upper edge 31 of a broiler plate 32 provided with perforations 33, this plate being maintained in an outwardly inclined position by a spacer 34 carried on the outer side of the plate 25, thus normally presenting an angular space 35 between the plates 25 and 32, open at its bottom to heat from the burner 23, the perforate broiler 32 having outstanding flanges 36 at its side edges to reenforce it.

A drip pan 38, downwardly inclined at its front is formed with rear reaching flanges 39 at its ends having recesses in their upper and lower edges to engage pins 40—41 set in the plates 16 in such manner as to permit removal of the pan when required, the upper edges of the pan being substantially level with these frame plates, while the lower edge of the broiler plate is adapted to enter therein.

An oven shown in broken lines and generally designated by the numeral 50 is provided with a grate 51 to adjustably seat on supports 52, the oven, when used, resting on the elements 19—20 at its lower edges and its top seating on the ledge 27 thus positioned directly over the burner.

It will be noted that the pan 24 may be supplied with water to act as a humidifier, and further, that it is offset relative to the burner 23, thereby inducing an air current to pass over the burner, under the oven plate 21 and thence to the space 35 so as to deliver heat to the broiler plate 32; also that the spacer 34 acts dually to reenforce the plate 32, preventing it from buckling and to direct the heated air to the lower portion of the plate where it is mostly required.

From the foregoing it will be seen that the apparatus may be conveniently used for its various purposes, either independently or simultaneously, as in baking or roasting, broiling or toasting, frying or broiling, thereby conserving the fuel used in the burner.

Having thus described the construction and operation of the apparatus, what is claimed as new and sought to secure by Letters Patent, is:—

1. In a cooking apparatus, a frame, a burner therebelow, a rectangular bottom plate supported by said frame over said burner, an outwardly inclined imperforate curtain plate integral with said frame at one end thereof, a perforate plate having a curled upper edge pivotally suspended at the upper corners of said curtain plate, means to form a triangular space between said curtain and perforate plates, the space being open at its bottom to receive heat from said burner, and a pan having inreaching flanges detachably suspended outwardly below said perforate plate and into which its lower edge extends.

2. In a cook apparatus having a leg supported horizontal frame, and a burner beneath said frame, an oven base plate having a concave upper surface seated on said frame over said burner, an upstanding curtain plate integral with said frame and inclined outwardly therefrom at its top, hook lugs on said curtain plate to suspend culinary appliances, a perforate plate pivoted at its upper edge to the corresponding edge of said curtain plate, reenforcements on the lateral edges of said perforate plate, spacers between said plates whereby said perforate plate is held at an angle, a pan into which the lower edge of said perforate plate extends, said pan extending outwardly therebeyond, pins fixed in opposed in-reaching relation in said frame below said spacers, and lateral flanges on said pan detachably engaging said pins.

IVAN ROČIĆ.